United States Patent
Bluhm

(10) Patent No.: US 10,458,392 B2
(45) Date of Patent: Oct. 29, 2019

(54) WIND POWER PLANT HAVING FREQUENCY MEASUREMENT

(71) Applicant: Senvion GmbH, Hamburg (DE)

(72) Inventor: Roman Bluhm, Norderstedt (DE)

(73) Assignee: SENVION GmbH, Hamburg (DE)

( * ) Notice: Subject to any disclaimer, the term of this patent is extended or adjusted under 35 U.S.C. 154(b) by 0 days.

(21) Appl. No.: 14/777,373

(22) PCT Filed: Mar. 4, 2014

(86) PCT No.: PCT/EP2014/054193
§ 371 (c)(1),
(2) Date: Sep. 15, 2015

(87) PCT Pub. No.: WO2014/139838
PCT Pub. Date: Sep. 18, 2014

(65) Prior Publication Data
US 2016/0040652 A1    Feb. 11, 2016

(30) Foreign Application Priority Data

Mar. 15, 2013   (DE) .................. 10 2013 204 600

(51) Int. Cl.
*F03D 7/02*      (2006.01)
*H02J 3/38*      (2006.01)
*F03D 9/25*      (2016.01)

(52) U.S. Cl.
CPC ........... *F03D 7/0284* (2013.01); *F03D 9/255* (2017.02); *H02J 3/386* (2013.01);
(Continued)

(58) Field of Classification Search
CPC ...... H02J 3/386; H02J 3/24; H02J 3/28; H02J 3/16; H02J 3/18; H02J 3/46;
(Continued)

(56) References Cited

U.S. PATENT DOCUMENTS 5,682,305 A * 10/1997 Kurokami ................. G05F 1/67
                                                           323/299
5,698,968 A    12/1997 Takagi et al.
(Continued)

FOREIGN PATENT DOCUMENTS

DE    695 04 457    2/1999
DE    100 22 974    11/2001
(Continued)

OTHER PUBLICATIONS

International Search Report and Written Opinion dated Jun. 12, 2014, directed towards International Application No. PCT/EP2014/054193, 9 pages.
(Continued)

*Primary Examiner* — Darrin D Dunn
(74) *Attorney, Agent, or Firm* — Morrison & Foerster LLP

(57) ABSTRACT

A method for controlling a wind turbine which is connected to an electrical grid, detects a grid frequency present in the grid and in the case of which the power output is regulated on the basis of the grid frequency by a controller and, in particular, switches off the power feed into the electrical grid if a limit value of a grid frequency is exceeded, wherein a change in the grid frequency over time is detected, a rate of change is determined and the rate of change is compared with a rate of change limit value and a modified frequency value is used to regulate the power output in the event of the rate of change limit value being exceeded.

15 Claims, 2 Drawing Sheets

(52) U.S. Cl.
CPC ... *F05B 2270/309* (2013.01); *F05B 2270/337* (2013.01); *Y02E 10/723* (2013.01); *Y02E 10/763* (2013.01)

(58) Field of Classification Search
CPC ....... Y02E 10/723; Y02E 40/30; F03D 7/048; F03D 7/0284; F03D 9/003; F03D 7/047; F03D 7/043; F03D 7/046; F05B 2270/337; F05B 2240/96; F05B 2270/309; F05B 2270/1041; F05B 2270/107
See application file for complete search history.

(56) References Cited

U.S. PATENT DOCUMENTS

| | | | | |
|---|---|---|---|---|
| 6,118,187 | A * | 9/2000 | Hepner | H02P 9/04 290/40 B |
| 7,898,099 | B2 * | 3/2011 | Stiesdal | F03D 7/0284 290/44 |
| 8,093,739 | B2 * | 1/2012 | Gilchrist | H02J 3/08 290/44 |
| 2003/0155773 | A1 | 8/2003 | Wobben | |
| 2004/0176841 | A1 * | 9/2004 | Ferguson | A61F 2/12 623/7 |
| 2006/0028025 | A1 | 2/2006 | Kikuchi et al. | |
| 2007/0120369 | A1 | 5/2007 | Delmerico et al. | |
| 2008/0001411 | A1 | 1/2008 | Ichinose et al. | |
| 2009/0234510 | A1 * | 9/2009 | Helle | F03D 7/0284 700/287 |
| 2010/0286835 | A1 | 11/2010 | Nyborg et al. | |
| 2010/0320762 | A1 * | 12/2010 | Letas | F03D 9/002 290/44 |
| 2011/0109086 | A1 | 5/2011 | Stiesdal | |
| 2011/0118891 | A1 * | 5/2011 | Hirst | H02J 3/14 700/295 |
| 2011/0153099 | A1 * | 6/2011 | Garcia | H02J 3/386 700/287 |
| 2012/0104756 | A1 | 5/2012 | Beekmann et al. | |
| 2013/0077367 | A1 * | 3/2013 | Zhu | H02J 3/16 363/97 |
| 2013/0110434 | A1 * | 5/2013 | Ho | G01R 19/2513 702/64 |
| 2013/0187385 | A1 * | 7/2013 | Wakasa | H02P 9/04 290/44 |
| 2013/0221669 | A1 * | 8/2013 | Yasugi | F03D 7/0284 290/44 |

FOREIGN PATENT DOCUMENTS

| | | |
|---|---|---|
| DE | 10 2005 034 635 | 2/2006 |
| DE | 10 2007 029 655 | 1/2008 |
| EP | 1 790 850 | 5/2007 |
| WO | WO-2010/000648 | 1/2010 |

OTHER PUBLICATIONS

International Preliminary Report on Patentability dated Sep. 24, 2015, directed towards International Application No. PCT/EP2014/054193, 13 pages.

* cited by examiner

WIND POWER PLANT HAVING FREQUENCY MEASUREMENT

REFERENCE TO RELATED APPLICATIONS

This application is a national stage application under 35 USC 371 of International Application No. PCT/EP2014/054193, filed Mar. 4, 2014, which claims priority to German Application No. 10 2013 204 600.6, filed Mar. 15, 2013, the entire contents of which are incorporated herein by reference.

FIELD OF THE INVENTION

The invention relates to a method for controlling a wind turbine which is connected to an electrical grid, detects a grid frequency present in the grid and in the case of which the power output is regulated on the basis of the grid frequency by a controller and, in particular, switches off the power feed into the electrical grid if a limit value of a grid frequency is exceeded.

BACKGROUND OF THE INVENTION

In the case of wind turbines, the output power of the wind turbine must be changed in the event of a change of frequency in the grid. In this case, it may be a requirement to reduce the power if the frequency increases. It is also known to operate the wind turbine in a throttled manner in order to be able to increase the power in the event of a drop in frequency. In the case of extreme frequency events in the grid, the power must be reduced to zero or the turbine must be isolated from the grid.

Methods such as this are known, for example, from DE 100 22 974 A1, from EP 1 790 850 or from WO 2010/000648 A2.

Said regulation is required since changes in the grid frequency are generally based on disturbances in the equilibrium of supply and demand in the grid. However, there are a multiplicity of grid events which have no influence on said equilibrium but are perceived as significant grid frequency disturbances within the grid measurement. By way of example, phase shifts in the case of switching processes in the grid may change the time between two zero-crossings, with the result that the grid measurement acquires these as a sudden frequency jump.

Wind turbines react, owing to the challenging requirements of the grid operator, to such events with sudden and considerable changes in power, which also include disconnection of the power feed-in in extreme cases. Said changes in power lead to changes in frequency and must be regulated by the grid operator. Such events are therefore undesirable.

SUMMARY OF THE INVENTION

A problem addressed by the present invention is to avoid the above disadvantages, to better detect the changes in the grid frequency and to allow the wind turbine to react better to events in the electrical grid.

This can be achieved by a method and in a device as broadly disclosed herein. Advantageous developments are disclosed in the detailed embodiments described below.

The procedure according to the invention is that, in the case of a wind turbine which is connected to an electrical grid, detects a grid frequency present in the grid and in the case of which the power output is regulated on the basis of the grid frequency by a controller and, in particular, switches off the power feed into the electrical grid if a limit value of a grid frequency is exceeded, a change in the grid frequency over time is detected, a rate of change is determined and the rate of change is compared with a rate of change limit value and a modified frequency value is used to regulate the power output in the event of the rate of change limit value being exceeded.

The invention has identified that the evaluation of the grid voltage, in particular of the positive edges of a zero-crossing, in the event of switching processes and faults in the grid leads to erroneous measurements and, consequently, the regulation of the wind turbines reacts wrongly owing to the erroneous measurement. The reaction leads to the wind turbine drastically changing its power feed-in, that is to say, in the event of an overfrequency, drastically reducing or, in the event of an underfrequency, drastically increasing (provided a power reserve has been retained) and thus triggering or worsening fluctuations in the frequency. In the extreme case, no more power is fed in. The generation power is thus suddenly lacking in the equilibrium of the electrical grid. Said fluctuations must then be compensated by regulatory interventions of conventional power stations.

In this case, the invention draws on the fact that the regulation does not compensate its own errors but modifies the measured variables. In this case, the rate of change of the frequency over time is detected and compared to a technically meaningful rate of change limit value for the rate of change. The measured value of the grid frequency as input variable for the regulator of the wind turbine is limited, in the event of the rate of change limit value being exceeded, to a frequency value which is modified with respect to the measured grid frequency. Said modified frequency value may preferably be the value at or before the introduction of the change in addition to the rate of change limit value multiplied by the time since the introduction of the change in frequency. If the rate of change limit value is not exceeded, the measured grid frequency is used to regulate the power output.

Said method excludes erroneous measurements of the frequency as are caused, for example, by phase shifts, and simultaneously obtains a high dynamic of the regulator since average-value forming or integral components in the control circuit are avoided. In addition, erroneous measurements are not completely ignored and what follows is a moderated change in the power feed-in corresponding to known reactions of conventional power stations; in particular, a sudden disconnection no longer occurs.

Preferably, the method is to be used if the modified frequency value has a lower rate of change in comparison with the non-modified frequency value; the rate of change is therefore limited and, in particular, the modified frequency value is calculated using an increase value or an increase function. The deviation of the modified frequency value therefore deviates less from the previously measured frequency value. The rate of change limit value and/or the increase value may in this case be selected such that it is in the range of the maximum rate of change of frequency of the electrical grid. Said rate of change of frequency is, in particular, in the range from 3 to 15 Hz/s. Such rates of change are present in grid-coupled synchronous generators of conventional thermal power stations.

Provision may further be made for the use of the modified frequency value to be temporally limited. This is particularly meaningful since, once a particular time has elapsed, it is to be assumed that, by transient, sudden processes in the grid, no effects on the grid frequency measurement persist; rather, the measured frequency is in fact present and the measurement is no longer faulty. Preferably, said time is in the range from 20 to 100 ms, particularly preferably in the range 20-50 ms. In particular, provision may further be made that, once the predefinable time has elapsed, the modified frequency value is returned smoothly to the measured limit value. The term "smoothly" is understood in this connection to mean that there is no sudden switchover to the non-modified measured frequency value; instead, the modified frequency value approaches the non-modified frequency value, for example via a ramp function. In a preferred development, provision is made that, in addition to the grid frequency, the level of the grid voltage present in the grid is measured and the frequency value is not modified as long as a predefined voltage limit value is not exceeded at the same time as the change in the grid frequency above the limit value.

In this connection, voltage limit value can be understood to mean both the level of the voltage and the increase of the voltage over time. By comparing the level of the grid voltage to a limit value, transient processes in the voltage are detected and thus the grid faults are differentiated from other processes, for instance phase shifts. The reliability of the error detection is further increased by this additional plausibility control of the frequency measurement.

In a preferred development, provision is made that the frequency is determined from the temporal spacing of the zero-crossings of the voltage, both with positive and with negative gradient, and in particular that the frequency can be determined from the voltage profile of all three phases. The above two measures for improvements to the frequency measurement have not been known before now. In the case of the wind turbine, they are particularly advantageous since the frequency is thus measured more often and in an improved manner.

The measurement on all three phases can likewise be used for plausibility checks, with the result that particularly strongly deviating measurements in a single phase are not taken into account as measurement errors and are thus not output. The measurement of the frequency can also be developed such that, in the event of a poor signal quality on one or two phases, the frequency of said phases is calculated from the phases with sufficiently good signal quality. The invention also relates to a corresponding wind turbine for performing the method.

BRIEF DESCRIPTION OF THE DRAWINGS

The invention is described by way of example below with reference to the appended drawings on the basis of an advantageous embodiment. With respect to all of the details according to the invention which are not explained in more detail in the text, reference is explicitly made to the drawings, in which.

DETAILED DESCRIPTION OF THE INVENTION

Figure 1:
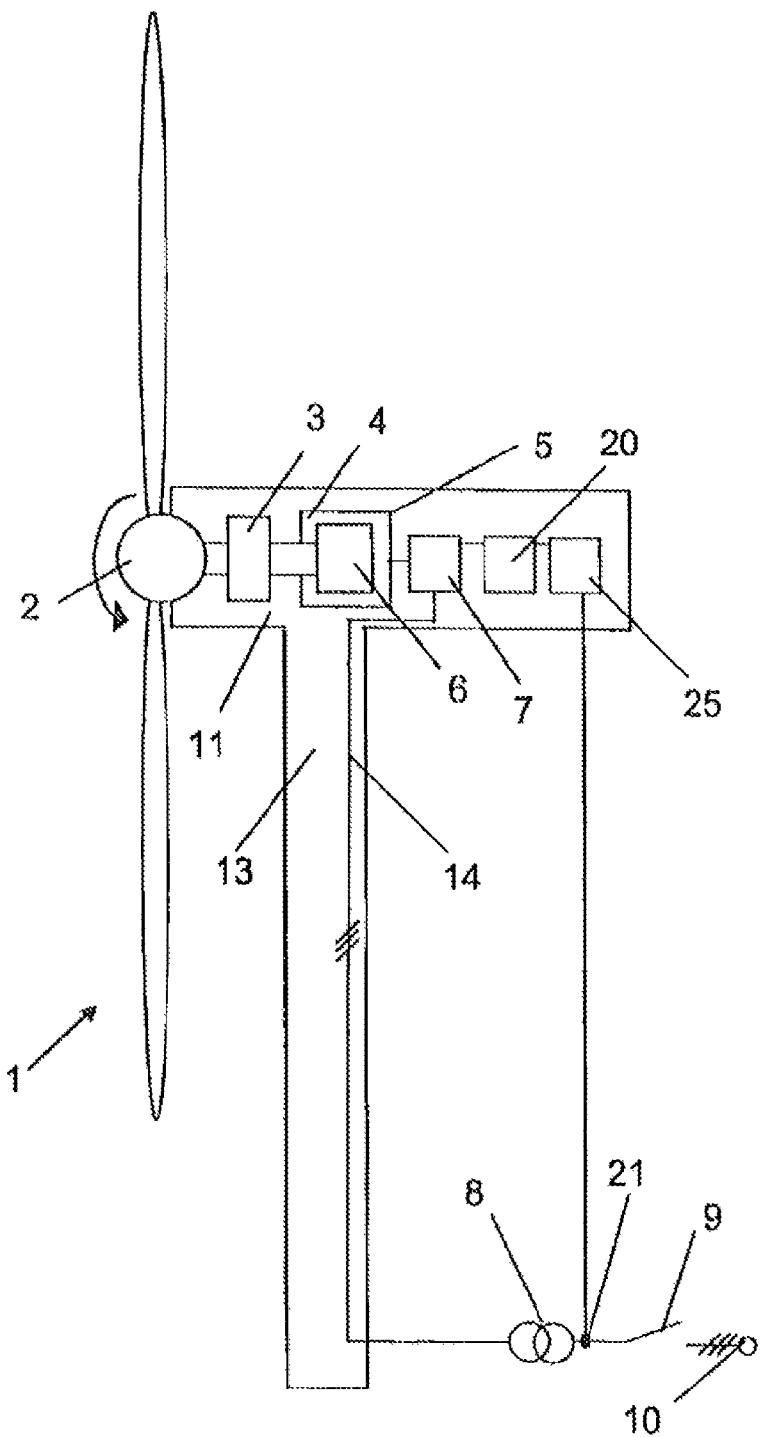
FIG. 1: shows a wind turbine.

The design of the wind turbine is briefly explained with reference to FIG. 1. The wind-powered rotor 2 of the wind turbine 1 is set into rotation by the wind. In this case, the wind-powered rotor 2 can be mechanically connected via a transmission 3 to the generator 4 and sets the rotor 6 of the generator 4 into rotation. The stator 5 of the generator is connected to a converter 7 by a conduit cable, which converter is in turn connected to the electrical grid 10 likewise via conduit cables in the tower 14, a transformer 8 and a circuit breaker 9. The voltage or the profile thereof is measured between converter 7 and electrical grid 10 by means of a voltage measuring device 21. The precise arrangement of the voltage measuring device 21 can in this case be selected on the basis of further technical requirements. In FIG. 1, the voltage measuring device 21 is on the high-voltage side of the transformer 8.

A frequency is calculated, from the voltage profile measured at the measurement point 21, in a frequency evaluation module 25 and is output to the controller 20. If there is a change in frequency in the electrical grid 10, the output power of the wind turbine is changed. In this case, the power can be increased or lowered after or during the change in frequency by regulation of the working angle of the rotor blades and/or by regulation of the torque of the generator, depending on the operating point of the wind turbine before the change in frequency.

In general, the level and type of change in power is determined with reference to the deviation of the actual frequency from the nominal frequency by the operator of the connected electrical grid.

Figure 2:
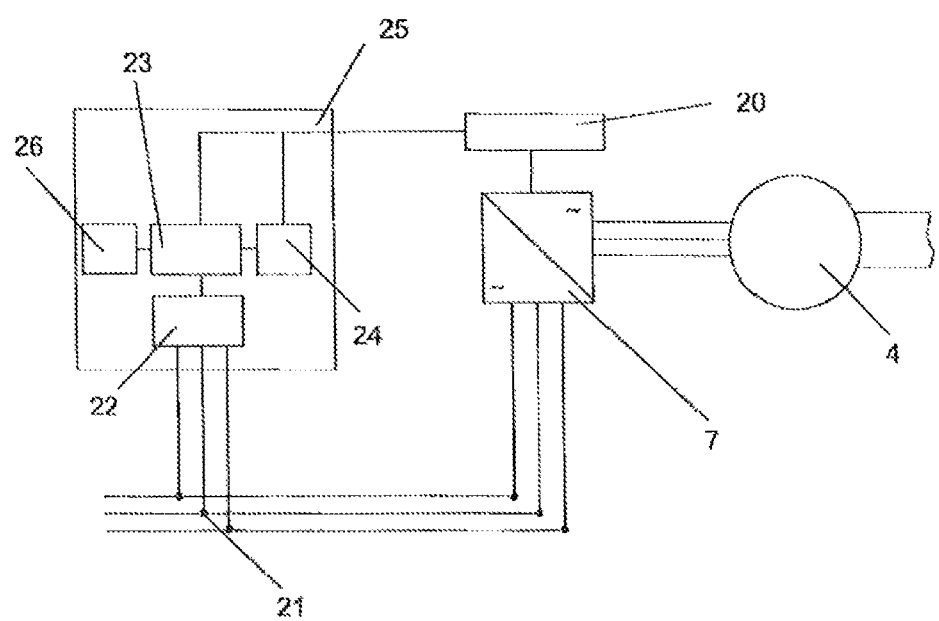
FIG. 2: shows the converter regulator according to the invention.

FIG. 2 shows in more detail the design of the regulator according to the invention.

By way of example the voltage profile of the electric voltage is measured using the voltage measuring device 21 and the voltage profile of at least one phase is output to the frequency evaluation module 25. Within the frequency evaluation module 25, the frequency is determined from the temporal spacings of the zero-crossings of the voltage profile in a frequency determination module 22 and is output to an increase module 23. The increase module 23 determines on the basis of predefined limit values the increase from the preceding frequency value to the present frequency value. In addition or alternatively, the increase module 23 can also be designed such that it calculates the increase with respect to any plurality of frequency values in the past and compares with one or various limit values.

If no limit value is to be exceeded, the increase module 23 outputs the unlimited frequency value to the controller 20, which outputs setpoint torque values which are optionally changed according to the internal parameterization of said controller to the converter 14, new blade angle requirements to the blade adjustment device (not shown) or disconnects the power feed-in of the wind turbine 1 by the circuit breaker 9 being opened and/or the converter 7 being correspondingly actuated.

If the increase module is to determine a limit value being exceeded, it forwards the frequency value to a limiting module 24 which calculates a new, limited frequency value on the basis of a maximum increase value or an increase function and the preceding frequency value, and outputs said new, limited value to the controller 20.

A plausibility module 26 measures the time and overrides the diversion of the frequency value from the increase module 23 to the limiting module 24 if the diversion exceeds a predefined time or provided that the voltage in the electrical grid does not simultaneously exceed a voltage limit value such that the frequency value calculated by the frequency determination module 22 is output directly from the increase module 23 to the controller.

The invention claimed is:

1. A method for controlling a wind turbine which is connected to an electrical grid comprising measuring a grid frequency present in the grid and regulating the power output of the wind turbine based on the measured grid frequency, wherein regulating the power output comprises:

detecting a change in the measured grid frequency over time, determining a rate of change of the measured grid frequency, determining whether the measurement of grid frequency is erroneous by comparing the rate of change of the measured grid frequency with a rate of change limit value that is based on a range of grid frequency rates of change that is associated with confidence in grid frequency measurements, in response to determining that the measurement of grid frequency is erroneous based on the rate of change of the measured grid frequency exceeding the rate of change limit value, regulating the power output using a modified frequency value, wherein the modified frequency value has a lower rate of change in comparison with the measured grid frequency and is calculated using an increase value or an increase function, and in response to determining that the measurement of grid frequency is not erroneous based on the rate of change of the measured grid frequency not exceeding the rate of change limit value, regulate the power output using the measured grid frequency unmodified.

2. The method for controlling a wind turbine of claim 1, wherein at least one of the rate of change limit value and the increase value is selected to be in the range of a maximum rate of change of frequency of the electrical grid.

3. The method for controlling a wind turbine of claim 1, wherein use of the modified frequency value is temporally limited.

4. The method for controlling a wind turbine of claim 1, comprising measuring grid voltage present in the grid, wherein the modified frequency is used when a voltage limit value is exceeded at a time that the rate of change limit value is exceeded.

5. The method for controlling a wind turbine of claim 1, wherein the frequency is measured from temporal spacing of zero-crossings of grid voltage, both with positive and with negative gradient.

6. The method for controlling a wind turbine of claim 1, wherein the frequency is measured from a voltage profile of all three phases.

7. The method for controlling a wind turbine of claim 1, comprising switching off the power feed into the electrical grid if a limit value of a grid frequency is exceeded.

8. The method for controlling a wind turbine of claim 2, wherein the maximum rate of change of frequency of the electrical grid is in a range from 3 to 15 Hz/s.

9. The method for controlling a wind turbine of claim 3, wherein regulating the power output comprises ceasing to use the modified frequency value and using the measured grid frequency once a predefinable time has elapsed.

10. A wind turbine comprising a generator driven by a wind-powered rotor for outputting electric power, a converter for converting at least some of the power output by the generator, a frequency measurement module that measures a frequency present in a connected electrical grid and outputs the measured frequency, and a controller configured to regulate the power output of the wind turbine on the basis of the measured frequency output by the frequency measurement module, wherein the frequency measurement module comprises:

an increase module that determines a rate of change of the measured frequency over time and determines whether the measurement of grid frequency is erroneous by comparing the rate of change of the measured frequency with a rate of change limit value that is based on a range of grid frequency rates of change that is associated with confidence in grid frequency measurements, and a limiting module that calculates a modified frequency value and outputs the modified frequency value to the controller when the rate of change of the measured frequency exceeds the rate of change limit value in the increase module, wherein the increase module:

outputs the measured frequency to the limiting module for calculation of the modified frequency value in response to determining that the measurement of grid frequency is erroneous based on the rate of change of the measured frequency exceeding the rate of change limit value, and outputs the measured frequency unmodified to the controller in response to determining that the measurement of grid frequency is not erroneous based on the rate of change of the measured frequency not exceeding the rate of change limit value.

11. The wind turbine of claim 10, wherein a predefined increase value or a predefined increase function is stored in the limiting module and the modified frequency value is calculated using the increase value or the increase function and the modified frequency value has a lower rate of change in comparison with the measured frequency.

12. The wind turbine of claim 10, wherein at least one of the rate of change limit value and the increase value is selected to be in the range of a maximum rate of change of frequency of the electrical grid.

13. The wind turbine of claim 12, wherein the maximum rate of change of frequency of the electrical grid is in a range from 3 to 15 Hz/s.

14. The wind turbine of claim 10, wherein the frequency detection module comprises a plausibility module that overmodulates the output of the modified frequency value such that the measured frequency is output to the controller.

15. The wind turbine of claim 14, wherein the plausibility module performs the overmodulation on the basis of the time which has elapsed since a start of at least one of a frequency increase and exceedance of a voltage limit value.

* * * * *